(12) United States Patent
Lefebvre et al.

(10) Patent No.: US 7,425,956 B1
(45) Date of Patent: Sep. 16, 2008

(54) SYSTEM AND METHOD FOR OCCLUSION TESTING WITH DEFERRED RENDERING

(75) Inventors: Kevin T. Lefebvre, Fort Collins, CO (US); Ross A. Cunniff, Fort Collins, CO (US)

(73) Assignee: NVIDIA Corporation, Santa Clara, CA (US)

( * ) Notice: Subject to any disclaimer, the term of this patent is extended or adjusted under 35 U.S.C. 154(b) by 256 days.

(21) Appl. No.: 11/158,023

(22) Filed: Jun. 21, 2005

(51) Int. Cl.
*G06T 15/00* (2006.01)
(52) U.S. Cl. ...................................... 345/421
(58) Field of Classification Search ................. 345/420, 345/421
See application file for complete search history.

(56) References Cited

U.S. PATENT DOCUMENTS

| | | | |
|---|---|---|---|
| 5,751,291 A | 5/1998 | Olsen et al. | |
| 6,042,235 A | 3/2000 | Machtig et al. | |
| 6,046,747 A | 4/2000 | Saunders et al. | |
| 6,476,806 B1 * | 11/2002 | Cunniff et al. | 345/421 |
| 6,727,899 B2 * | 4/2004 | Hoffman et al. | 345/421 |
| 6,731,304 B2 | 5/2004 | Sowizral et al. | |

OTHER PUBLICATIONS

Meagher, "Efficient Synthetic Image Generation of Arbitrary 3-D Objects", 1982, IEEE, pp. 473-478.*
"GL_HP_visibility_test", NVIDIA Corporation, No Date Available. pp. 1-5.
Bartz et al. "Extending Graphics Hardware For Occlusion Queries in OpenGL", ACM 1998, pp. 97-104.
"SGIX_instruments", http://oss.sgi.com/projects/ogl-sample/registry/SGIX/instruments.txt, Sep. 18, 1997.
"$GL_{13}HP\_occlusion\_test$", NVIDIA Corporation, No Date Available.

* cited by examiner

*Primary Examiner*—Almis R. Jankus
(74) *Attorney, Agent, or Firm*—Patterson & Sheridan, LLP (57) ABSTRACT

One embodiment of the present invention sets forth a method for implementing occlusion testing prior to processing a primitive command. The method includes the steps of determining that an occlusion test should be performed on an enclosed primitive, saving the primitive command on a deferred list, and disabling a rendering functionality in hardware. The method also includes the step of performing an occlusion query on the enclosed primitive where a pixel count is generated that indicates how many pixels within a bounding volume defined around the enclosed primitive are visible. One advantage of this method is that it provides occlusion testing functionality for graphics applications that do not use the occlusion testing functionality provided by graphics APIs. Implementing occlusion testing functionality in this fashion reduces rendering time, thereby increasing rendering performance.

19 Claims, 6 Drawing Sheets

SYSTEM AND METHOD FOR OCCLUSION TESTING WITH DEFERRED RENDERING

BACKGROUND OF THE INVENTION

1. Field of the Invention

Embodiments of the present invention relate generally to computer graphics, and more specifically to a system and method for occlusion testing.

2. Description of the Related Art

In computer graphics, oftentimes portions of a first geometry in an image block from view portions of a second geometry in the image. In such situations, one or more primitives making up the first geometry are said to "occlude" one or more primitives making up the second geometry. For example, when rendering a car, the primitives comprising the body and hood may occlude the primitives of the interior and the engine.

As is well-known, occlusion testing is used to increase rendering performance by determining which primitives in an image are occluded by other primitives in the image. Once this information is known, only non-occluded primitives are rendered since these are the only primitives in view. Not rendering the occluded primitives reduces rendering time, thereby increasing rendering performance. Returning to the car example, by determining which primitives making up the interior and the engine are occluded and then not rendering those primitives, overall render time is reduced since time is not spent rendering parts of the car that are hidden from view.

In order to increase rendering performance, some graphics applications use the occlusion testing functionality that is directly available in graphics application program interfaces (APIs), such as the Open Graphics Library (OpenGL®). Sometimes, however, graphics applications fail to implement the occlusion testing functionality available in the APIs, leaving the graphics application with no occlusion testing functionality. In such cases, overall render performance may not be optimized.

As the foregoing illustrates, what is needed in the art is a means to enable occlusion testing functionality for applications that do not use available occlusion testing functionality.

SUMMARY OF THE INVENTION

One embodiment of the present invention sets forth a method for implementing occlusion testing prior to processing a primitive command. The method includes the steps of determining that an occlusion test should be performed on an enclosed primitive, saving the primitive command on a deferred list, and disabling a rendering functionality in hardware. The method also includes the step of performing an occlusion query on the enclosed primitive where a pixel count is generated that indicates how many pixels within a bounding volume defined around the enclosed primitive are visible. If the pixel count is non-zero (i.e., the primitive may be visible), then the saved primitive command is executed; otherwise, the primitive command is not executed.

One advantage of the disclosed method is that it provides occlusion testing functionality for graphics applications that do not use the occlusion testing functionality provided by graphics APIs, such as OpenGL®. Implementing occlusion testing functionality with the disclosed method reduces rendering time, thereby increasing rendering performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
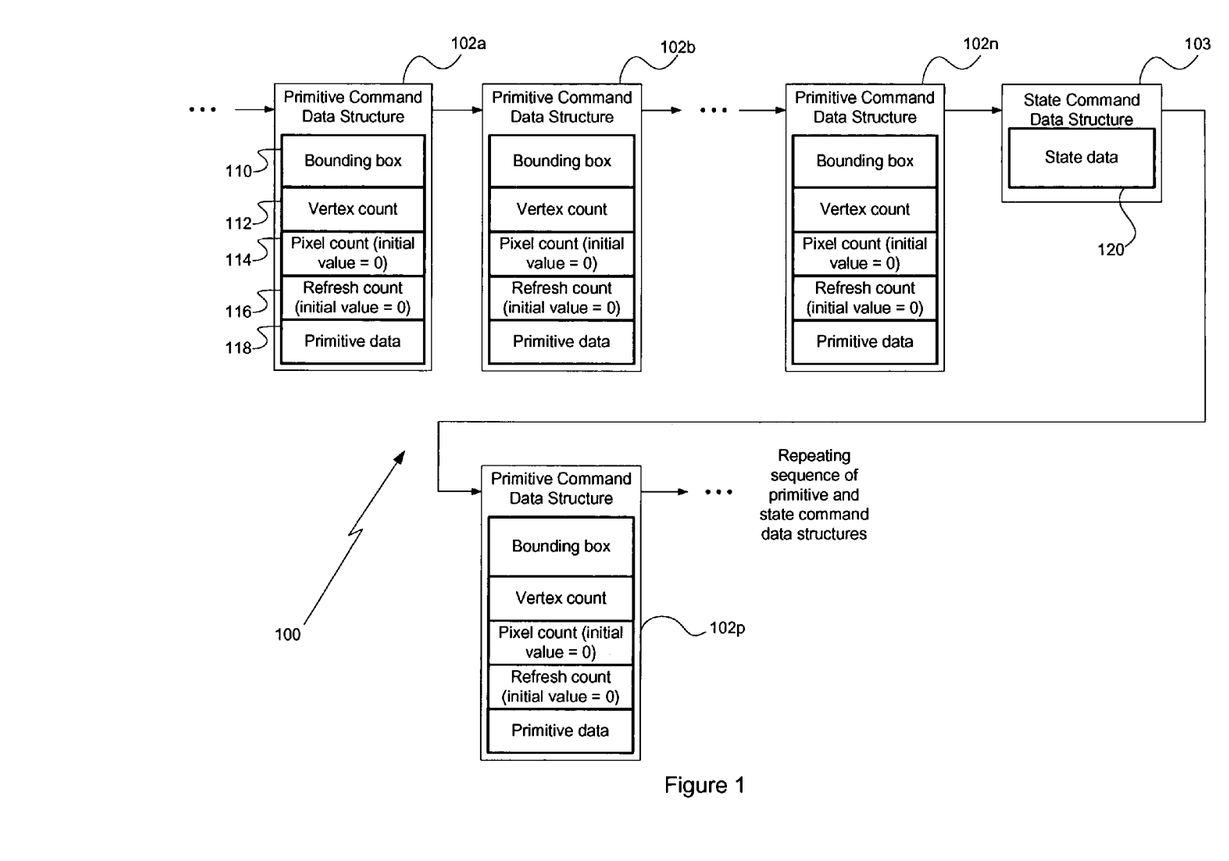
FIG. 1 is a conceptual illustration of a linked display list, according to one embodiment of the present invention.

FIG. 1 is a conceptual illustration of a linked display list 100, according to one embodiment of the present invention. A display list includes a series of graphics commands that are either primitive commands or state commands in no particular order or quantity. As shown, the linked display list 100 includes, without limitation, a series of one or more primitive command data structures 102a, 102b . . . 102n, followed by a series of one or more state command data structures, represented by state command data structure 103, followed by another series of one or more primitive command data structures, represented by primitive command data structure 102p. The linked display list 100 may also include header information (not shown). As is well-known, the linked display list 100 is generated when a display list is compiled. When the compiled display list is executed, the linked display list 100 is examined, and the and the information included in the primitive command data structures and the state command data structures is used to render a graphics image.

As is also well-known, a primitive is a low-level graphics building block that may include points, lines, quadrilaterals, general polygons and the like. A graphics image is typically comprised of a plurality of primitives. A primitive command is a graphics language command whose execution causes all or part of a primitive to be rendered or partially rendered. Each primitive command has a corresponding primitive command data structure. A primitive command data structure includes information that describes all or part of a primitive to a graphics hardware unit, such as a graphics processing unit (GPU), so that the graphics hardware unit can render all or part of the primitive. For example, as is also shown in FIG. 1, the primitive command data structure 102a may include, without limitation, a bounding box 110, a vertex count 112, a pixel count 114, a refresh count 116 and other primitive data 118. The bounding box 110 is a box that encloses all or part of the primitive to be rendered (hereinafter referred to as the "enclosed primitive"). To render the enclosed primitive, the primitive command associated with the primitive command data structure 102a is executed using vertex and other primitive data included in the data structure. In alternative embodiments, other bounding volumes may be used instead of a bounding box, such as a sphere or other geometric solid.

The vertex count 112 represents the number of vertices that are included within the bounding box 110 and, hence, the complexity of the enclosed primitive. Generally, a high vertex count is associated with a complex enclosed primitive since the amount of primitive data associated with the enclosed primitive increases as the vertex count increases. Since more primitive data is associated with complex primitives than with simpler primitives, complex primitives take longer to render than simpler primitives. As will be described in greater detail herein, the vertex count is one factor used to determine whether occlusion testing is applicable in view of an enclosed primitive associated with a given primitive command because the rendering performance gain typically associated with occlusion testing diminishes as the amount of primitive data associated with the enclosed primitive decreases. The minimum number of vertices required to be within the bounding box before occlusion testing may be implemented as a tunable parameter for optimizing the rendering process.

The pixel count 114 represents the number of visible pixels within the bounding box 110 and, hence, the number of pixels that are fully processed when the enclosed primitive is rendered. If some of the pixels associated with the enclosed primitive are occluded, then those pixels do not contribute to the pixel count 114 since occluded pixels are not processed during rendering. For example, if all the pixels of the enclosed primitive are occluded, then no pixels would be processed during rendering and the pixel count would be zero. As will be described in greater detail herein, the pixel count 114 is initialized to zero and is changed when an occlusion query is performed. The pixel count is initialized to zero so that an occlusion query is forced the first time a primitive command is processed.

The refresh count 116 tracks the number of frames that have passed since an occlusion query was last performed on the enclosed primitive. As will be described in greater detail herein, an occlusion query does not need to be executed each time a frame is rendered. Rather, the results of the previous occlusion test are assumed to be valid for an arbitrary number of frames. This arbitrary number of frames is a parameter that may be tuned to further optimize the rendering process. Like the pixel count 114, the refresh count 116 is initialized to zero so that an occlusion query is forced the first time a primitive command is processed.

Other primitive data 118 includes data that describes primitive attributes such as points, vertices, colors, lines, quadrilaterals, general polygons and the like.

The bounding box, vertex count and primitive data associated with a given primitive command data structure are generated when the display list is compiled. As will be described in greater detail herein, the pixel count and refresh count associated with a given primitive command data structure are updated as occlusion testing is performed on the enclosed primitive associated with the primitive command data structure.

A state command is a graphics language command that includes state information for one or more primitives to be rendered. When a state command is executed, the state information included in the state command is applied to the one or more primitives. As is well-known, state information includes line colors, line widths, shading information and the like. The state command has a corresponding state command data structure 103. The state command data structure 103 includes state data 120, which includes the state information described above.

Figure 2A:
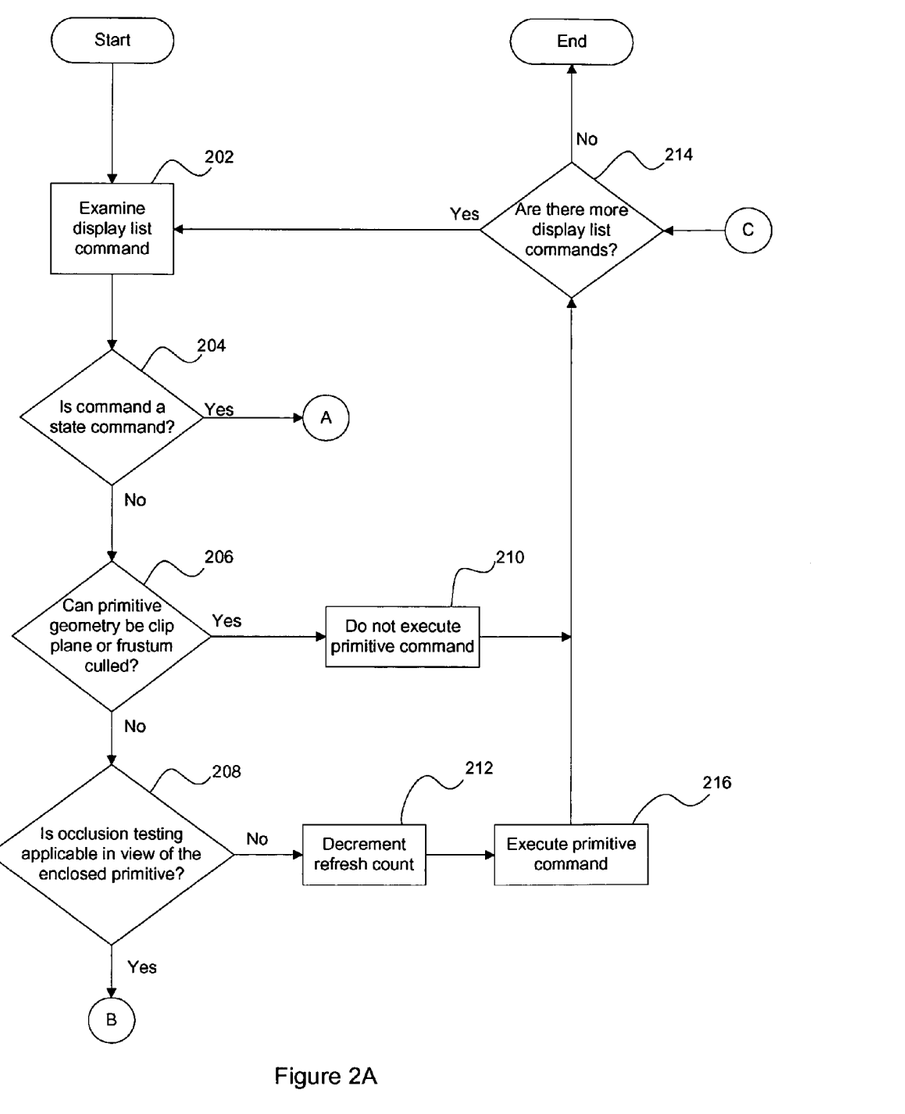
FIGS. 2A-2C set forth a flowchart of method steps for implementing occlusion testing through deferred rendering, according to one embodiment of the present invention.
Figure 2B:
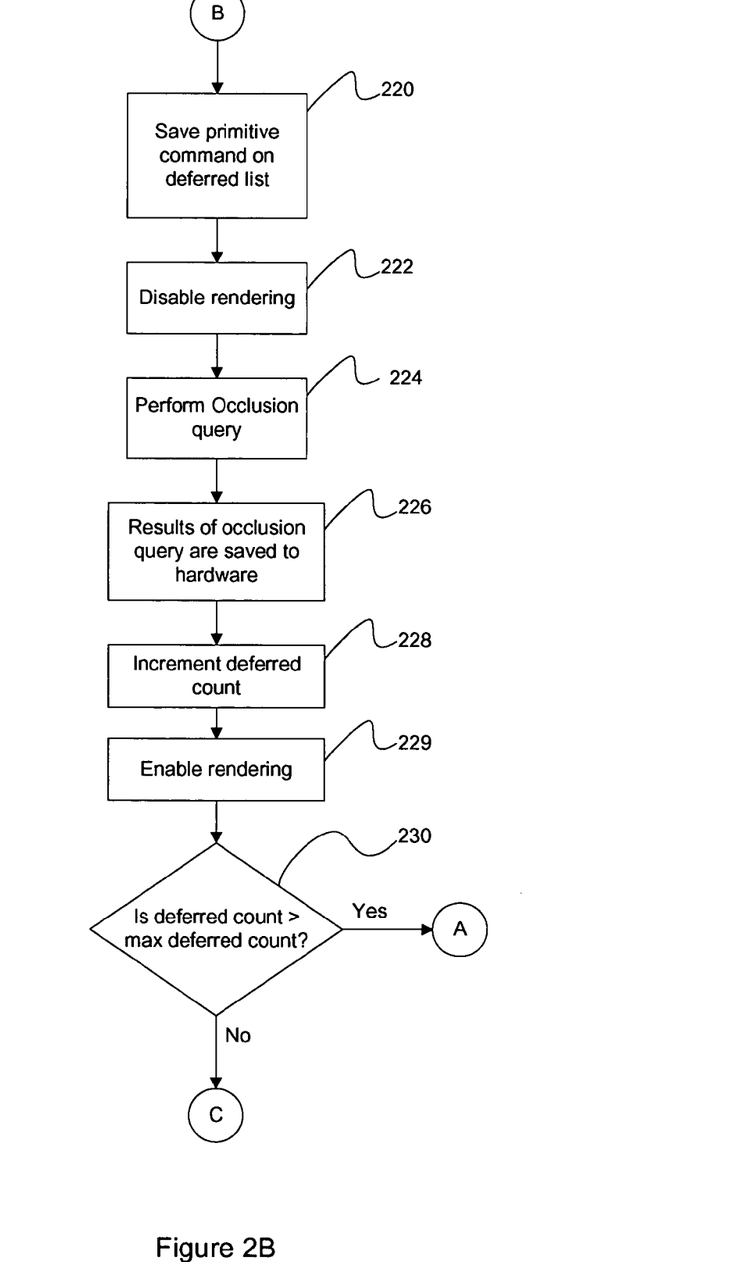
Figure 2C:
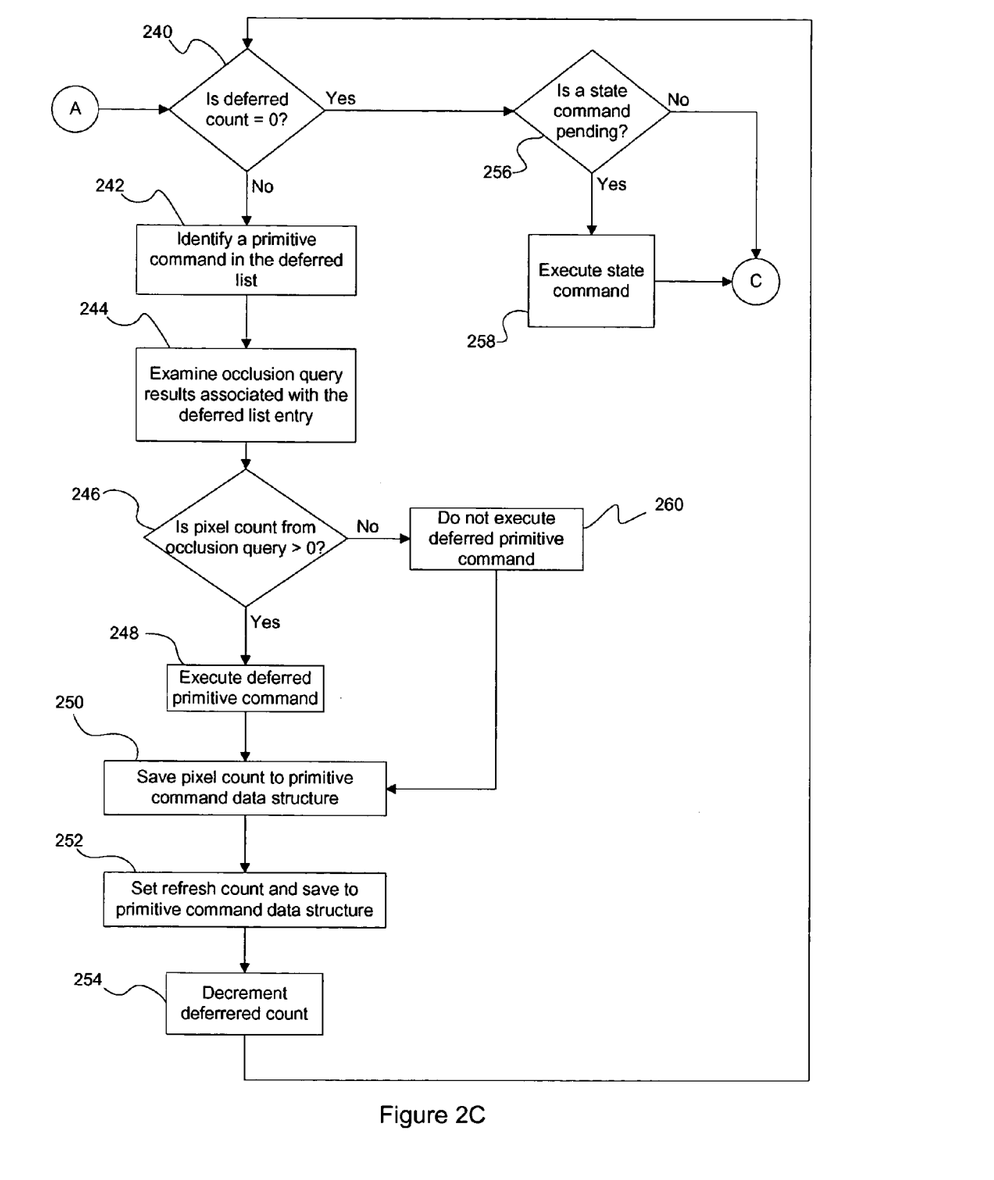

FIGS. 2A-2C set forth a flowchart of method steps for implementing occlusion testing through deferred rendering, according to one embodiment of the present invention. Persons skilled in the art will recognize that any system configured to perform the method steps in any order is within the scope of the invention.

As shown in FIG. 2A, the method for implementing occlusion testing begins in step 202, where a software driver examines a display list command that is to be processed. As discussed in FIG. 1, the linked display list 100 includes primitive command data structures, state command data structures and header information associated with graphics commands, such as OpenGL® commands. There is a primitive command associated with each primitive command data structure and a state command associated with each state command data structure. These primitive commands and state commands make up the display list commands.

In step 204, the software driver determines whether the display list command is a state command. If the display list command is a state command, then the method proceeds to step 240 of FIG. 2C. If, however, the software driver determines that the display list command is a primitive command, then in step 206 the software driver determines if the enclosed primitive associated with the primitive command (i.e., the primitive or part of a primitive enclosed by the bounding box included in the primitive command data structure with which the primitive command is associated) can be clip plane or view frustum culled. As is well-known, clip plane culling increases rendering performance by not rendering primitives that are excluded from the image by arbitrarily defined clipping planes. As is also well-known, view frustum culling increases rendering performance by not rendering primitives that are not in the frustum that comprises the field of view of the graphics scene.

If, in step 206, the primitive can be view frustum or clip plane culled, then the method proceeds to step 210 and the primitive command is not executed; therefore, the enclosed primitive associated with the primitive command is not rendered. The method then proceeds to step 214, where the software driver determines whether there are any more display commands to process. If there are no more display commands to process, then the method ends. If there are more display commands to process, the method returns to step 202.

If, in step 206, the enclosed primitive cannot be view frustum or clip plane culled, then the method proceeds to step 208, where the software driver determines if occlusion testing is applicable in view of the enclosed primitive. Several criteria are examined in order to determine whether occlusion testing is applicable since there is a computational cost associated with occlusion testing. In one embodiment, these criteria include the vertex count, the pixel count and the refresh count. By performing occlusion testing only on enclosed primitives that satisfy the vertex count, pixel count and refresh count criteria, the software driver attempts to perform occlusion testing only in cases where such testing should yield rendering efficiencies that outweigh the computational costs associated with occlusion testing. For example, if an enclosed primitive includes only a handful of vertices, then the time that is spent performing an occlusion query on such a relatively simple primitive may be greater than the time required to simply render the primitive. In such a case, overall rendering time may be reduced by not performing an occlusion test on the enclosed primitive. The process for determining whether occlusion testing is applicable and the criteria associated with that determination are described in greater detail below in conjunction with FIG. 3.

If, in step 208, the software driver determines that occlusion testing is applicable in view of the enclosed primitive, then the method proceeds to step 220 of FIG. 2B. If, however, the software driver determines that occlusion testing is not applicable, then the method proceeds to step 212, where the refresh count is decremented. As previously mentioned, the refresh count tracks the number of frames that have passed since an occlusion query was last performed on the enclosed primitive. In an effort to reduce the computational overhead associated with occlusion testing, the software driver is configured to assume that when an occlusion query shows that one or more pixels associated with an enclosed primitive are visible in a given frame, the same one or more pixels remain visible in one or more subsequent frames (i.e., the occlusion query results remain valid for one or more subsequent frames). One consequence of this approach is that an occlusion query does not need to be performed each time a primitive command is executed to render a frame. However, since the relative positions of the primitives in the graphics image may change over time, an occlusion test needs to be performed again on the enclosed primitive after an arbitrary number of frames (N) have passed, where N may be a tunable parameter. In one embodiment, the enclosed primitive is retested when the refresh count has a value of zero. As will be described in greater detail in FIG. 2C, the refresh count is set to N after the results of an occlusion query are examined. In step 212, after the refresh count is decremented by one, the new refresh count is saved in the primitive command data structure associated with the primitive command being processed (and the enclosed primitive), thereby enabling the software driver to track the number of frames for which the occlusion query results have been used. If the refresh count is already zero, then the refresh count remains zero.

In step 216, the primitive command is executed by the GPU. By executing the primitive command, the pixels associated with the enclosed primitive are rendered to the frame buffer in the GPU. The method then returns to step 214.

If, in step 208, the software driver determines that occlusion testing is applicable, then the method proceeds to step 220 of FIG. 2B, where the software driver saves the primitive command to a deferred list. In step 222, the rendering functionality is disabled in hardware. As persons skilled in the art will understand, no pixels are rendered to the frame buffer when a primitive command is executed by the hardware while the rendering functionality is disabled. Generally, disabling the rendering functionality may include, but is not limited to, clearing frame buffer masks, disabling lighting and disabling z-buffer updates. In step 224, an occlusion query is performed on the enclosed primitive associated with the primitive command saved on the deferred list (hereinafter referred to as the "deferred primitive command"). When an occlusion query is performed, the GPU executes an occlusion command using the bounding box associated with the enclosed primitive. As is well-known, an occlusion command directs the hardware to render the bounding box associated with a primitive command. As a result of executing the occlusion command, the hardware generates a pixel count that represents the number of visible pixels contained within the bounding box (i.e. the number of visible pixels associated with the enclosed primitive). Since occluded pixels are not rendered, they do not contribute to the pixel count. Thus, an occlusion query that results in a pixel count of zero indicates that the enclosed primitive is completely occluded, with the bounding box containing no visible pixels. The occlusion query is implemented using the same functionality that is provided to support occlusion testing directly through an API, such as OpenGL®.

In step 226, the result of the occlusion query (i.e., the pixel count) is saved to hardware for later retrieval. In step 228, the deferred count is incremented. The deferred count is the number of primitive commands that have been added to the deferred list and therefore indicates how many occlusion query results have been stored in hardware for later retrieval. In step 229, the rendering functionality is enabled in hardware.

In step 230, the software driver determines if the maximum deferred count has been reached. The maximum deferred count is a tunable threshold that limits the number of deferred primitive commands that may be placed on the deferred list. Since each occlusion query requires some amount of time to complete, processing efficiencies may be achieved by queuing several occlusion queries and then processing the results of those queries at a later time. However, if too many occlusion queries are deferred, then overall rendering time may be adversely affected since too much processing is deferred. Thus, limiting the number of deferred primitive commands on the deferred list limits the potential backlog of occlusion query results. If the deferred count is less than the maximum deferred count, then the method returns to step 214 of FIG. 2A. However, if the deferred count is equal to the maximum deferred count, then the method proceeds to step 240 of FIG. 2C.

In step 240, the software driver determines if the deferred count is zero. Step 240 is executed when either a state command is encountered n the linked display list 100 or the maximum deferred count is exceeded. If the deferred count is zero, then the method proceeds to step 256 (discussed below). If, however, the deferred count is not zero, then in step 242, the software driver identifies a primitive command entry on the deferred list (i.e., one of the deferred primitive commands from step 220). In step 244, the software driver reads the occlusion query results associated with the identified deferred primitive command from hardware. Again, the result of the occlusion query is a pixel count that indicates the number of pixels that would be visible if the enclosed primitive corresponding to the deferred primitive command were rendered (i.e., if the deferred primitive command were executed while the rendering functionality in hardware was enabled). In step 246, the software driver determines whether the pixel count resulting from the occlusion query is greater than zero. If the pixel count is greater than zero, then the corresponding enclosed primitive has one or more visible pixels associated with it, and, in step 248, those visible pixels are rendered by executing the deferred primitive command while the rendering functionality in hardware is enabled. If, however, the software driver determines that the pixel count is zero, then the enclosed primitive is occluded and is not rendered. Thus, the deferred primitive command is not executed, as indicated by step 260.

In step 250, the pixel count resulting from the occlusion query is saved to the primitive command data structure associated with the deferred primitive command (and the corresponding enclosed data structure). As will be described in greater detail in FIG. 3, the pixel count saved in a particular primitive command data structures 102 is used to determine whether occlusion testing is applicable in view of the enclosed primitive associated with that primitive command data structure (step 208 of FIG. 2A). In step 252, the refresh count is set in the primitive command data structure associated with the deferred primitive command (and the corresponding enclosed data structure). As previously described, the software assumes that the results of an occlusion query are valid for an arbitrary number of frames, and the refresh count is decremented each time the results of a past occlusion query are used for to render a frame. Once the refresh count equals zero, an occlusion test may be performed again on the corresponding enclosed primitive. In one embodiment, the refresh count is set to a fixed arbitrary number, N. In alternative embodiments, the refresh count may be determined based on the pixel count associated with an enclosed primitive. Since a larger primitive likely will occlude another primitive for longer period of time relative to a smaller primitive, the result of an occlusion test performed on a larger enclosed primitive may remain valid for a greater number of frames than the result of an occlusion test performed on smaller enclosed primitive. Larger primitives, which typically have greater pixels counts, may therefore require longer refresh periods. In step 254, the deferred count is decremented, and the method returns to step 240.

Referring now back to step 256, assuming that the deferred count is zero in step 240, the software driver determines whether the execution of a state command is pending. If a state command is pending, then in step 258, the state command is executed. If, however, there is no state command pending, then the method returns to step 214 of FIG. 2A. Persons skilled in the art will recognize that the method disclosed herein uses the state commands as a trigger that causes the deferred primitive commands included in the deferred list to be examined and processed. The deferred list, therefore, is examined when either the maximum deferred count is reached (as described in step 230 of FIG. 2B) or when the software driver encounters a state command in the linked display list 100 (as described in step 256 of FIG. 2C).

Figure 3:
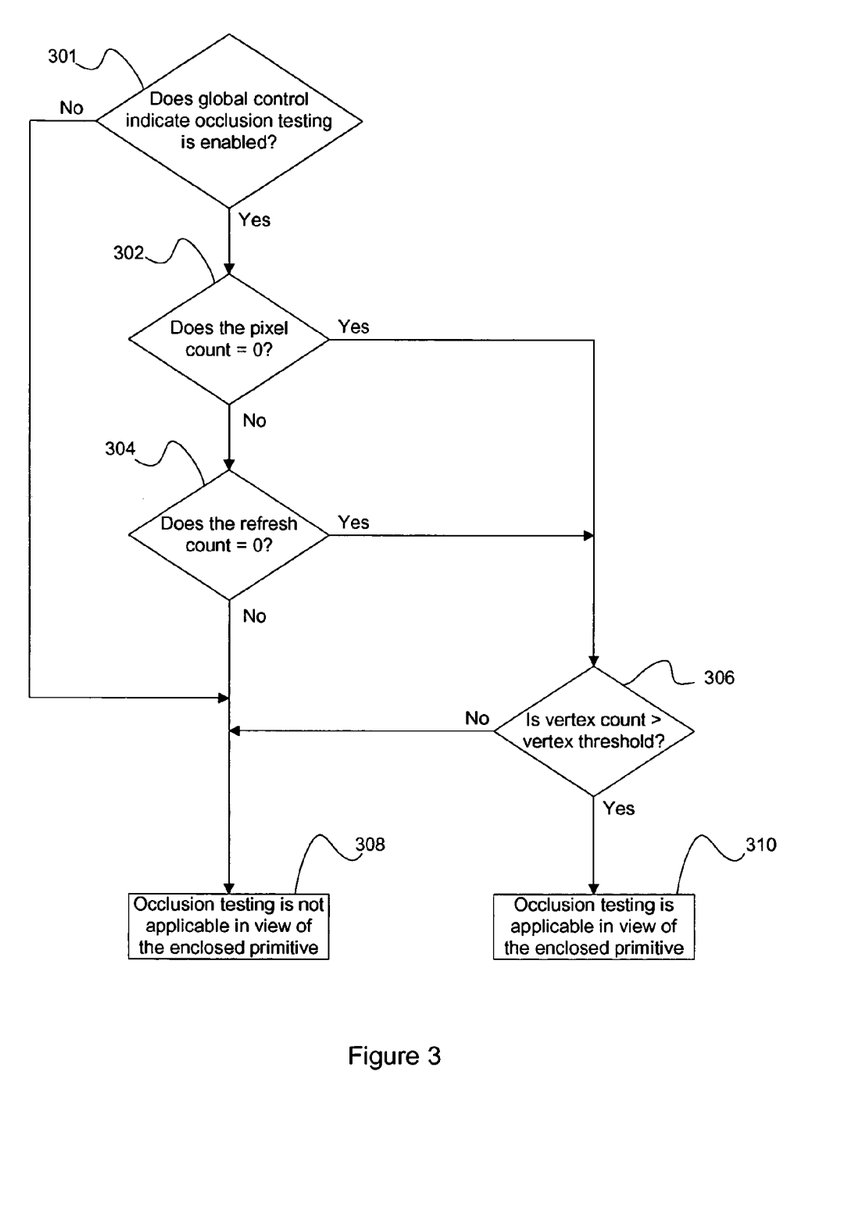
FIG. 3 is a flowchart of method steps for determining whether occlusion testing is applicable in view of a given enclosed primitive, according to one embodiment of the present invention.

FIG. 3 is a flowchart of method steps for determining whether occlusion testing is applicable in view of a given enclosed primitive, according to one embodiment of the present invention. Persons skilled in the art will recognize that any system configured to perform the method steps in any order is within the scope of the invention.

The method of FIG. 3 discusses in greater detail the substeps of step 208 of FIG. 2A. Occlusion testing reduces rendering time by not rendering pixels that are occluded by other pixels. As previously described, although the amount of time needed to perform an occlusion query is typically less than the time required to actually render an enclosed primitive, overall rendering time may be optimized by not performing an occlusion test on every enclosed primitive each time a frame is rendered. To this end, if occlusion testing is enabled, then the software driver inspects the data stored in the primitive command data structure associated with an enclosed primitive to determine whether an occlusion test should be performed on the enclosed primitive when a frame is rendered. The parameters examined include the pixel count 114, the refresh count 116 and the vertex count 112. In alternative embodiments, fewer or more than three parameters may be examined.

As shown, the method begins in step 301, where the software driver determines if a global control indicates that occlusion testing is enabled. Occlusion testing may be controlled by a global control that enables or disables occlusion testing. If the global control indicates that occlusion testing is not enabled, then the method proceeds to step 308. If, on the other hand, the global control indicates that occlusion testing is enabled, then in step 302, the software driver determines if the pixel count associated with the enclosed primitive (e.g., pixel count 114 in primitive command data structure 102a) is equal to zero. Again, the pixel count is the number of visible pixels associated with the enclosed primitive as determined by the occlusion query. If no pixels are visible, then the enclosed primitive is completely occluded and the pixel count is zero. The method is structured such that, in one embodiment, the software driver assumes that an enclosed primitive completely occluded in one frame will not be occluded in the subsequent frame. Therefore, if a previous occlusion query indicates that the enclosed primitive was occluded, then a new occlusion test is performed on the enclosed primitive when the next frame is rendered, so long as the vertex count criterion is met (step 306 below). Similarly, the pixel count is initialized to zero, which causes an occlusion test to be performed on an enclosed primitive the first time a frame that includes the enclosed primitive is rendered. If the pixel count equals zero, then the method proceeds to step 306.

In step 306, the software driver determines if the vertex count associated with the enclosed primitive (e.g., vertex count 112 in primitive command data structure 102a) is greater than a threshold value, referred to as the "vertex threshold." Again, the vertex count is proportional to the amount of data associated with the enclosed primitive. More complex primitives typically have higher vertex counts than less complex primitives. If the amount of data associated with the enclosed primitive is relatively small, as indicated by the vertex count being less than the vertex threshold, then the processing efficiencies gained from occlusion testing may be substantially diminished. In such cases, occlusion testing is arguably not terribly worthwhile. In one embodiment, the vertex threshold is an arbitrary number that may be adjusted to optimize rendering performance. If the vertex count is not greater than the vertex threshold, then the software driver does not implement occlusion testing on the enclosed primitive, as indicated in step 308. If, however, the vertex count is greater than the vertex threshold, then the software driver implements occlusion testing on the enclosed primitive, as indicated in step 310.

Referring back to step 302, if the pixel count does not equal zero, then the method proceeds to step 304, where the software driver determines if the refresh count associated with the enclosed primitive (e.g., refresh count 116 in primitive command data structure 102a) equals zero. As described above, the refresh count allows the software driver to track the number of frames for which the results of an occlusion query have been used. The method is structured such that, in one embodiment, the software driver assumes that if the pixel count from step 302 is non-zero, then the enclosed primitive is required for the current frame. As previously explained, after a set number of frames have been rendered, the software driver performs a new occlusion test on the enclosed primitive to determine whether the enclosed primitive is still visible. The refresh count is initialized to zero, which causes an occlusion test to be performed on an enclosed primitive the first time a frame that includes the enclosed primitive is rendered. This approach reduces overall rendering time since an occlusion test is not performing on the enclosed primitive each time a frame is rendered. If, in step 304, the software driver determines that the refresh count does not equal zero, then the method proceeds to step 308. If in step 304, however, the software driver determines that the refresh count equals zero, then the method proceeds to step 306, previously described herein.

Table 1 pseudo-code includes a set of instructions that may be used to implement portions of the method of FIGS. 2A-2C and FIG. 3.

TABLE 1

```
deferredCount = 0
While (cmd is primitive_cmd) {
    If (cmd.boundBox outside view frustum) skip cmd
    else if (cmd.boundBox outside user clip planes) skip cmd
    else if (deferredOcclusion ok) &
((cmd.refresh == 0) | cmd.pixCnt == 0) &
cmd.vertexCnt > vertexThreshold) {
        save cmd on deferred list
        disable rendering in hardware
        start occlusion query
```

TABLE 1-continued

```
            render contents of bounding box
            end occlusion query
            deferredCount++
            enable rendering in hardware
            if (deferredCount > max deferred) exit loop}
        else execute primitive command
    cmd = next cmd
    if (cmd.refresh == 0) cmd.refresh = 0 else
    cmd.refresh = cmd.refresh − 1 }
    deferredEntry = first entry on deferred list
    while (deferredCount != 0) {
        read occlusion query result for deferred list entry
        if (occlusion query result visible) render deferredEntry
        else skip deferredEntry
        save occlusion query result to corresponding command data structure
        set and save refresh count to corresponding command data structure
        deferredCount-
        deferredEntry = next entry from deferred list }
```

The methods of FIGS. 2A-2C and FIG. 3 advantageously provide occlusion testing functionality to applications that do not use occlusion testing functionality provided by an API. Occlusion testing functionality is used transparently to reduce the rendering time and thereby increase rendering performance. Furthermore, there are several parameters that may tuned to enable the rendering performance to be optimized. These parameters include, without limitation, the refresh count, the maximum deferred count and the vertex threshold.

The disclosed methods reduce rendering time by performing occlusion tests on selected enclosed primitives and rendering only the non-occluded pixels. Rendering time is further reduced by not applying the occlusion query to the enclosed primitive each time the frame is rendered. The occlusion query is not applied if the enclosed primitive does not include sufficient vertices to make the occlusion test worthwhile or the results of a previous occlusion query are assumed to be valid for the current frame. For example, if during the rendering of a first frame, the occlusion query indicated that an enclosed primitive included one or more visible pixels and the refresh count was set at twenty, then during the rendering of the subsequent frame, an occlusion test would not be performed since the refresh count would be greater than zero.

Figure 4:
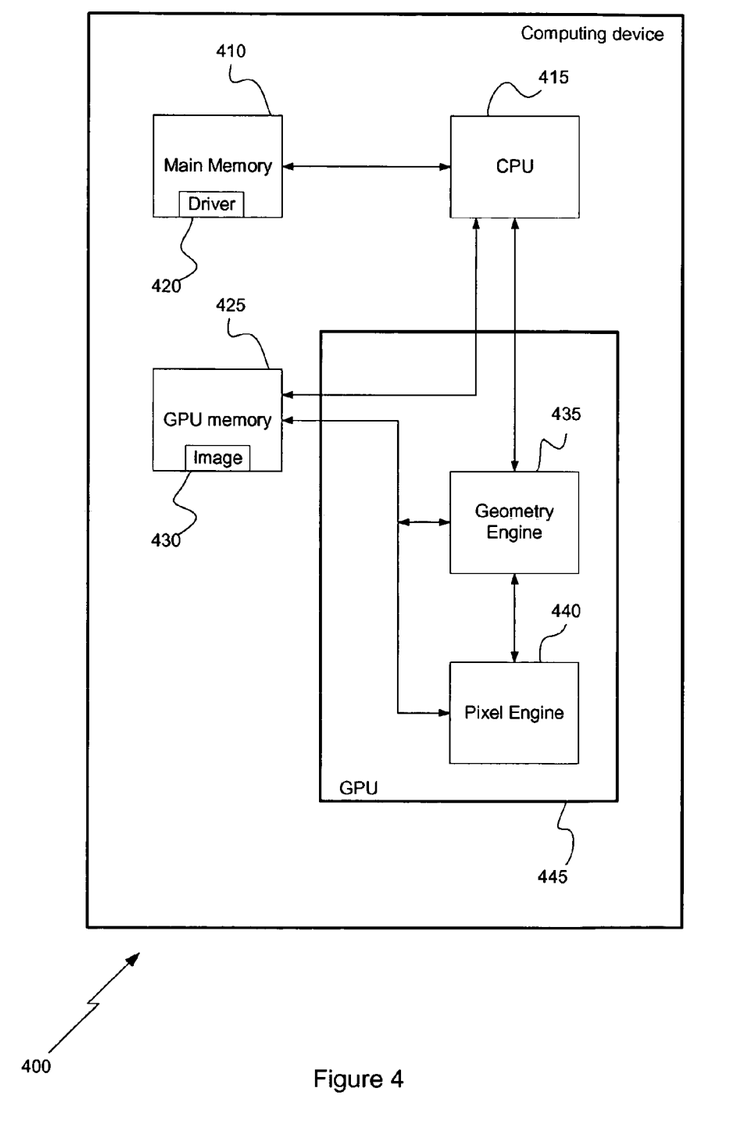
FIG. 4 is a conceptual diagram of a computing device that may be configured to implement one or more aspects of the present invention.

During occlusion testing, the software driver creates a deferred list of primitive commands by examining a linked display list that is generated when the graphics application is compiled. A primitive command is added to the deferred list for each occlusion test the software driver implements. Primitive commands are added to the deferred list until either the defined maximum number of deferred primitive commands is reached or a state command is encountered in the linked display list. Either of these events causes the software driver to process the primitive commands in the deferred list FIG. 4 is a conceptual diagram of a computing device 400 that may be configured to implement one or more aspects of the present invention. As shown, the computing device 400 may include, without limitation, a CPU 415, a GPU 445, a main memory 410, and GPU memory 425. The CPU 415 is coupled to the main memory 410, which stores data and software programs, such as a software driver 420, that are executed by the CPU 415. The CPU 415 is also coupled to the GPU 445, which includes a geometry engine 435 and a pixel engine 440. The geometry engine 435 and the pixel engine 440 render primitives by executing primitive commands and also perform occlusion queries, as previously described herein. The GPU 445 is also coupled to the GPU memory 425.

The GPU 445 stores GPU instructions and graphics related data such as the rendered image 430 in the GPU memory 425.

While the foregoing is directed to embodiments of the present invention, other and further embodiments of the invention may be devised without departing from the basic scope thereof, and the scope thereof is determined by the claims that follow.

We claim:

1. A method for implementing occlusion testing prior to processing a primitive command, the method comprising:
   determining that an occlusion test should be performed on an enclosed primitive;
   saving the primitive command on a deferred list;
   disabling a rendering functionality in hardware; and
   performing an occlusion query on the enclosed primitive including executing the primitive command while the rendering functionality in hardware is disabled to generate a pixel count, wherein the pixel count indicates how many pixels within the bounding volume are visible.

2. The method of claim 1, wherein the enclosed primitive comprises at least a portion of a primitive enclosed by a bounding volume.

3. The method of claim 1, further comprising the step of storing the pixel count associated with the primitive command in hardware.

4. The method of claim 1, further comprising the steps of identifying the primitive command on the deferred list and reading from hardware the pixel count associated with the primitive command.

5. The method of claim 4, further comprising the step of rendering the enclosed primitive, if the pixel count associated with the primitive command is greater than zero.

6. The method of claim 5, wherein the step of rendering comprises executing the primitive command while the rendering functionality in hardware is enabled to generate one or more visible pixels.

7. The method of claim 1, wherein the step of determining that an occlusion test should be performed comprises determining that a number of vertices associated with the enclosed primitive is greater than a threshold number.

8. The method of claim 7, wherein the step of determining that an occlusion test should be performed comprises determining that a pixel count associated with the enclosed primitive is equal to zero.

9. The method of claim 7, wherein the step of determining that an occlusion test should be performed comprises determining that a refresh count associated with the enclosed primitive is equal to zero.

10. the method of claim 1, further comprising the step of rendering the enclosed primitive, if the pixel count associated with the primitive command is greater than zero.

11. A computer-readable medium storing instructions for causing a computing device to implement occlusion testing prior to processing a primitive command by performing the steps of:
    determining that an occlusion test should be performed on an enclosed primitive;
    saving the primitive command on a deferred list;
    disabling a rendering functionality in hardware; and
    performing an occlusion query on the enclosed primitive executing the primitive command while the rendering functionality in hardware is disabled to generate a pixel count, wherein the pixel count indicates how many pixels within the bounding volume are visible.

12. The computer-readable medium of claim 11, wherein the enclosed primitive comprises at least a portion of a primitive enclosed by a bounding volume.

13. The computer-readable medium of claim 11, further comprising the step of storing the pixel count associated with the primitive command in hardware.

14. The computer-readable medium of claim 11, further comprising the steps of identifying the primitive command on the deferred list and reading from hardware the pixel count associated with the primitive command.

15. The computer-readable medium of claim 14, further comprising the step of rendering the enclosed primitive, if the pixel count associated with the primitive command is greater than zero.

16. The computer-readable medium of claim 15, wherein the step of rendering comprises executing the primitive command while the rendering functionality in hardware is enabled to generate one or more visible pixels.

17. The computer-readable medium oc claim 15, further comprising the step of rendering the enclosed primitive, if the pixel count associated with the primitive command is greater than zero.

18. A computing device configured to implement occlusion testing prior to processing a primitive command, the computing device comprising:
   a memory;
   a processing unit; and
   a software driver storing instructions for causing the processing unit to perform the steps of:
      determining that an occlusion test should be performed on an enclosed primitive,
      saving the primitive command on a deferred list,
      disabling a rendering functionality in hardware, and
      performing an occlusion query on the enclosed primitive executing the primitive command while the rendering functionality in hardware is disabled to generate a pixel count, wherein the pixel count indicates how many pixels within the bounding volume are visible.

19. The computing device of claim 18, wherein the pixel count is greater than zero, and further comprising the step of executing the primitive command while the rendering functionality in hardware is enabled to generate one or more visible pixels.

* * * * *

UNITED STATES PATENT AND TRADEMARK OFFICE
CERTIFICATE OF CORRECTION

| | | |
|---|---|---|
| PATENT NO. | : 7,425,956 B1 | |
| APPLICATION NO. | : 11/158023 | |
| DATED | : September 16, 2008 | |
| INVENTOR(S) | : Lefebvre et al. | |

It is certified that error appears in the above-identified patent and that said Letters Patent is hereby corrected as shown below:

In Column 10, Line 51, please replace "the method" with --The method--.

In Column 11, Line 19, please replace "oc" with --of--.

Signed and Sealed this

Sixth Day of January, 2009

JON W. DUDAS
*Director of the United States Patent and Trademark Office*